United States Patent [19]

Joshi

[11] Patent Number: 4,964,374
[45] Date of Patent: Oct. 23, 1990

[54] RECIPROCATING PISTON INTERNAL COMBUSTION ENGINES AND LIKE MACHINES

[76] Inventor: Vasant M. Joshi, 4/49 Vishnu Prasad, M.G. Road, Post Office Vile Parle (East) Bombay 400 057, Maharashtra, India

[21] Appl. No.: 336,067

[22] Filed: Apr. 11, 1989

[51] Int. Cl.⁵ .............................................. F02B 75/32
[52] U.S. Cl. .......................... 723/197 AB; 123/198 F
[58] Field of Search ..... 123/197 R, 197 AB, 197 AC, 123/198 F

[56] References Cited

U.S. PATENT DOCUMENTS 2,252,153  8/1941  Anthony ...................... 123/197 AB
4,111,164  9/1978  Wuerfel ....................... 123/197 AB

FOREIGN PATENT DOCUMENTS 471793  5/1952  Italy .............................. 123/197 AB

*Primary Examiner*—David A. Okonsky
*Attorney, Agent, or Firm*—Ladas & Parry

[57] ABSTRACT

One or more cylinders of an engine or machine have the pattern (2) connected to the crankshaft (8) by connecting arm (4) and bearing block (7). Locking and unlocking mechanism (8, 9 and 10) locks the connecting arm and the bearing block when the cylinder is in the active mode; and unlocks them allowing free relative movement between them under conditions of part-load or no-load, to save on mechanical losses even while crankshaft continues to rotate at required machine R.P.M. Locking and unlocking is performed either at the top or the bottom dead center positions of the piston, which is also the parking place for the piston whenever the connecting arm and the bearing block have free relative movement. Auxiliary functions related to the working cylinder are also suspended when the piston is parked.

20 Claims, 3 Drawing Sheets

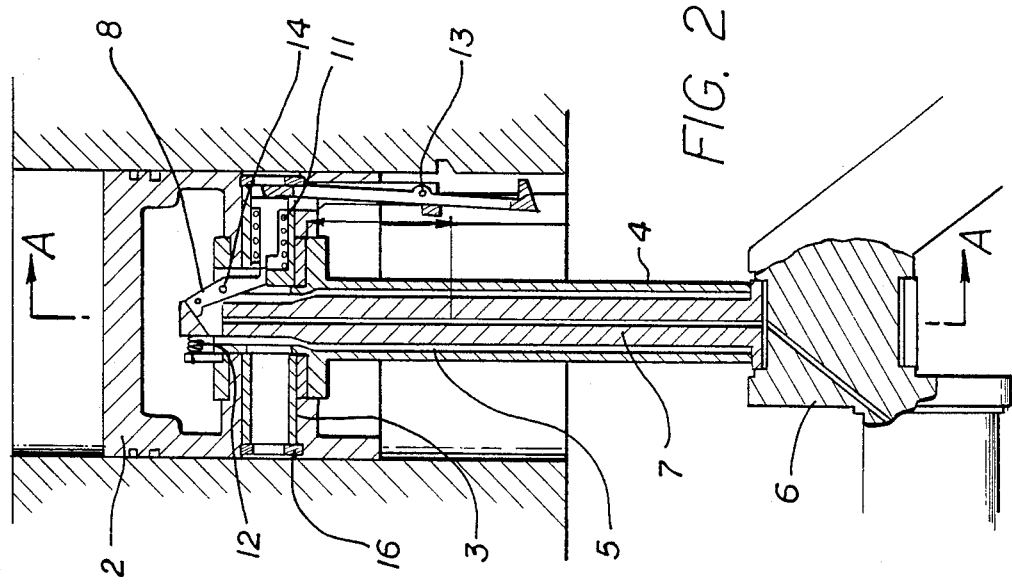
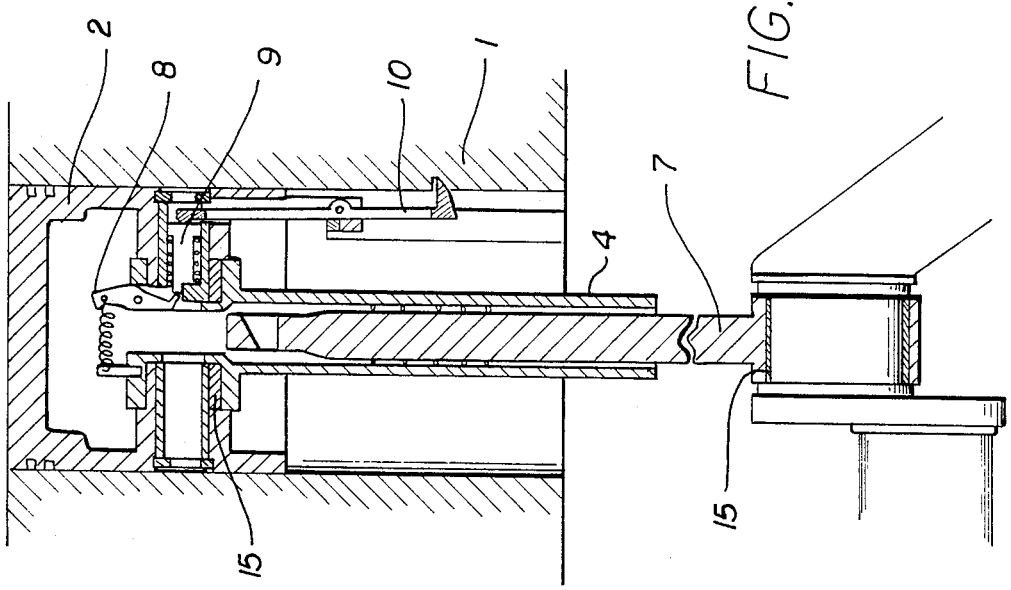

RECIPROCATING PISTON INTERNAL COMBUSTION ENGINES AND LIKE MACHINES

BACKGROUND

This invention relates to machines with reciprocating pistons in one or more cylinders and particularly concerns Internal Combustion Engines, hereinafter referred to as engines or engine, more particularly those engines constructed so as to give better fuel economy, better control and stability of operation, and having less engine wear and creating less exhaust emissions.

PRIOR ART

Known to the art are many types of machines having one or more pistons moving reciprocally within cylinders and where this motion causes, or is caused by, the rotary motion of a crankshaft, through the medium of the connecting rod. One such family of machines are the Internal Combustion Engines which have one or more cylinders arranged in various configurations, running on different types of fuels, different systems of fuel injection or carburation, with spark ignition or compression ignition firing systems and working in a 2-stroke or 4-stroke cycle. The novel features of the present invention can be incorporated in all sorts of machines which incorporate one or more connecting rods or like devices.

Any machine, particularly an engine, which is normally designed to operate under conditions of its maximum rated load, is often operated under partial load conditions for sustained periods. The provision of a higher power reserve under these conditions is necessary; however it is always accompanied by more internal losses, resulting in a poorer efficiency of the machine.

OBJECTS OF THE INVENTION

The prime object of the present invention is to increase the partial load efficiency of a reciprocating piston machine by reducing its internal losses while maintaining its power reserve. In case of an engine, it is also an object to produce less and cleaner exhaust gases. Another object of the invention is to simplify the fuel delivery and/or the carburation requirements of any engine, thus enabling a smoother and stabler engine operation, over the entire range of speeds and loads of the engine and to increase the possibilities of multi-fuel operation.

Other objectives and advantages of the invention will become apparent according to the following specification and drawings.

BRIEF DESCRIPTION OF THE INVENTION

Although the mechanical power output from any engine is derived from the movement of the piston within the cylinder, the frictional losses caused in this movement and in the consequential movement of gases, are the principal source of internal mechanical losses in the engine. In the known art, the piston is joined to the crankpin of the crankshaft by means of a rigid connecting rod. The rotation of the crankshaft necessarily causes the corresponding reciprocating strokes of the connected piston and vice-versa. The present invention replaces the connecting rod by a novel combination of three components (a) The bearing block, (b) The connecting arm, and (c) The locking device. With the use of these components as per the invention, it is possible for the crankshaft of the engine to rotate without causing motion of any one, some or all of the pistons of the engine under partial load conditions where (nil or) lesser number of piston strokes can still generate the necessary power from the engine in a stable manner. According to the invention, the reciprocating movements of a piston in any cylinder can be suspended in any cycle by parking the piston at one end of its normal stroke in a cylinder even while the engine is running. The required partial power is obtained from fewer, but more efficient thermodynamic cycles with less mechanical friction, and with less need for throttling, or addition of excess air. The engine as claimed is thus more efficient in operation than the Prior Art engines, under no load or partial load conditions. The claimed engine maintains its power reserve, at all speeds and loads, as a conventional engine, because it is possible to almost immediately render all its cylinders active for all cycles whenever required. This also has obvious parallels in case of other machines.

VARIOUS EMBODIMENTS OF THE INVENTION

In one embodiment of the claimed engine, the need for throttling or maintaining a high excess air ratio is totally eliminated, and the engine's power output is effectively controlled by regulating the number of cylinders rendered passive. This number is reevaluated constantly in response to operating requirements. The balance active cylinders are then operated at near their individual peak power outputs at those speeds. Air is freely admitted in every active cylinder for each of its active cycles and a predetermined amount of fuel, to give the desired excess air coefficient dictated by the relative stress on power or economy, typically ranging between 0.8 and 1.3, is injected during the compressive stroke of these cycle. A feedback control system in closed loop, senses the speed of the engine and compares it with the desired speed. It automatically increases or decreases the number of active strokes in proportion to the load on the engine, or the desired acceleration or retardation.

In another embodiment, there is a provision for equalizing the wear and tear and heat generation in all the cylinders under operations of partial loads by equally distributing the active strokes in all the cylinders. In yet another embodiment, the inlet and exhaust valves of the cylinders are kept closed and the electric spark is eliminated, in their passive cycles, to reduce the auxiliary internal load on the engine.

In yet another embodiment, there are means to have alternate compression ratios in a cylinder of a engine by having more than one alternate positions for locking the bearing block to the connecting arm when rendering the piston active from its parked condition.

In a further embodiment, there are further means to cause or suppress the electric spark even in the active cycles, and means to admit various types of fuels into the cylinders. The engine as embodied, is capable of operation on a wide range of fuels - gasoline, kerosene, diesel, etc. in the same or different cycles, and/or in the same or different cylinders.

In one embodiment of the invention, some of or all the pistons in the engine are parked for a variable number of cycles, "X", and are active for another variable number of cycles, "Y". The duty cycle, or the ratio $Y/(X+Y)$, is controlled to give the required average power over a period of time corresponding to cycles (X+Y). This method of switched mode operation, is also used to control an improved single cylinder engine as per the invention. In another embodiment of the invention, each piston of an engine becomes active, as and when the load on the engine becomes more than a certain reference level; and is passive otherwise. As a result, the number of active cylinders at any given moment is somewhat proportional to the momentary load on the engine. In this embodiment, it is preferred to have different constructions for different cylinders depending on their rank in the order of activation; e.g. the cylinders becoming active under the lightest loads have the smallest diameters, more wear resistance, are connected to a smaller carburator, have a lower compression ratio and are spaced out equally in the cycle. On the other hand, the cylinders of 'last resort' which become active at highest loads have large diameters, are connected to a bigger carburettor, rated for lesser working life, have more valves, more cooling aids, and may be turbocharged.

In yet another embodiment of the invention, the engine is provided with a blower or like device which introduces additional air in the exhaust manifold of the engine to partly, fully or overcompensate for the decreased volume of exhaust gases, when it is operated with one or more passive cylinders to avoid condensation, improve scavenging, and to decrease the percentage concentration of the contaminants in the exhaust gases.

REFERENCE TO DRAWINGS

For a better understanding of the invention, and to show how the same can be carried into effect, reference will now be made, by way of example, to the accompanying drawings, which refer to a spark-ignited, in-line 4 cylinder, fuel injected, free breathing and uncarburetted, 4 stroke gasoline operated motor vehicle engine.

FIG. 1 is a somewhat diagrammatic sectional side view of one cylinder of one embodiment of the engine; with the part sections of the connecting arm, bearing block, needle bearings and crankpin of the crankshaft shown along their centerline, showing the geometry of the modified engine components in one embodiment of the present invention. As shown, the piston is parked at the top dead center position, even while the crankpin is at an intermediate position. The bearing block is midway within the connecting arm and free to slide within it. An axial hole in the bearing block, brings oil from the crankpin for the lubrication in this movement.

FIG. 2 shows a similar view in case of an active piston for the same angular position of the crankpin.

FIG. 3 is the view along section A—A of FIG. 2 above, showing the piston, the locking frame, and the cylinder block with the vertical relieving groove on the bore and the solenoid assembly. At the top of this groove, a cross hole opens out of the cylinder block enabling the plunger of a solenoid to enter into this groove whenever its solenoid coil is energized. The center portion of the plunger is made of magnetic materials while the rest of it is non-magnetic in construction.

Figure 5:
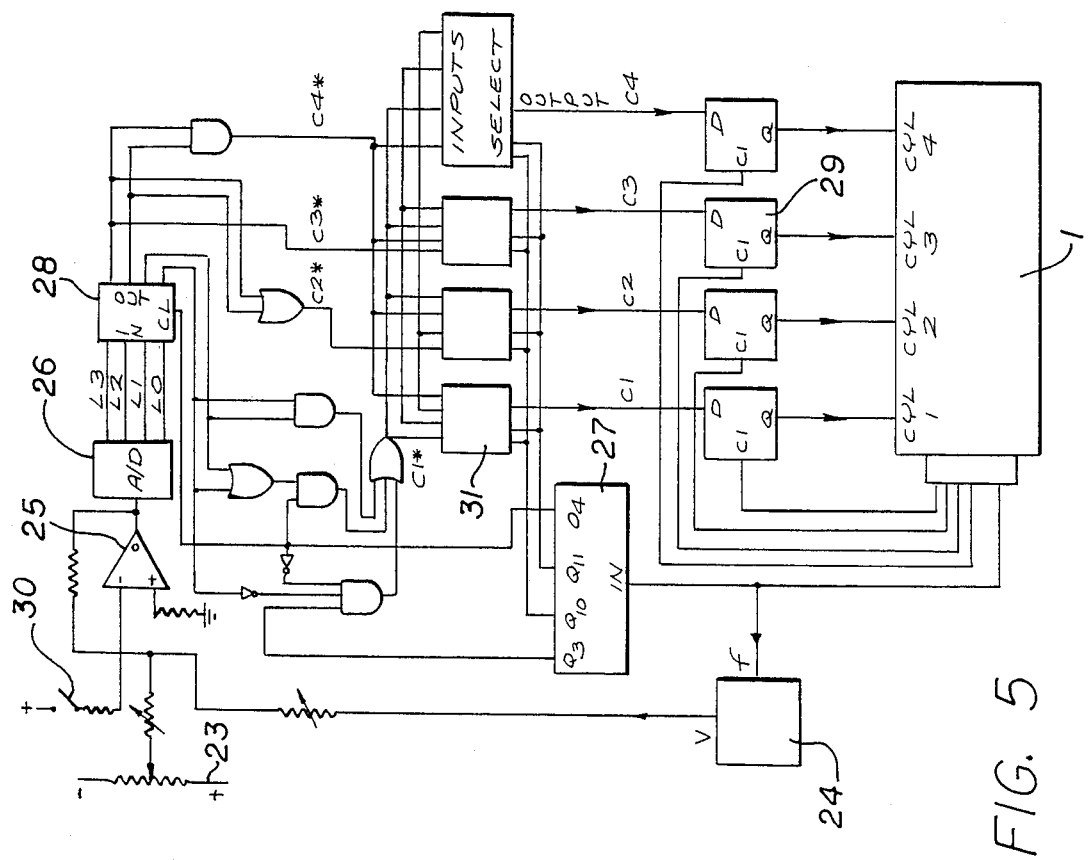
FIG. 5 shows the electronic circuit diagram which controls the embodiment of the invention shown in FIGS. 1-4.

Referring to the figures, the designations of various components are as follows: Cylinder block 1, piston 2, gudgeon pins 3, connecting arm 4, needle bearings 5, crankpin 6, bearing block 7, locking lever 8, locking pin 9, locking plate 10, springs 11 and 12, pivot pins 13 and 14, bimetallic bushes 15, circlips 16, solenoid coil 17, plunger 18, rocker arm 19, push rod 20, valve 21, shifter 22, accelerator potentiometer 23, frequency to voltage converter 24, summing amplifier 25, analog to digital convertor 26, 12 stage binary counter 27, 4 bit latch 28, D flip-flop 29, brake switch 30, 4 channel multiplexer 31.

WORKING OF THE ILLUSTRATED EMBODIMENT

Figure 3:
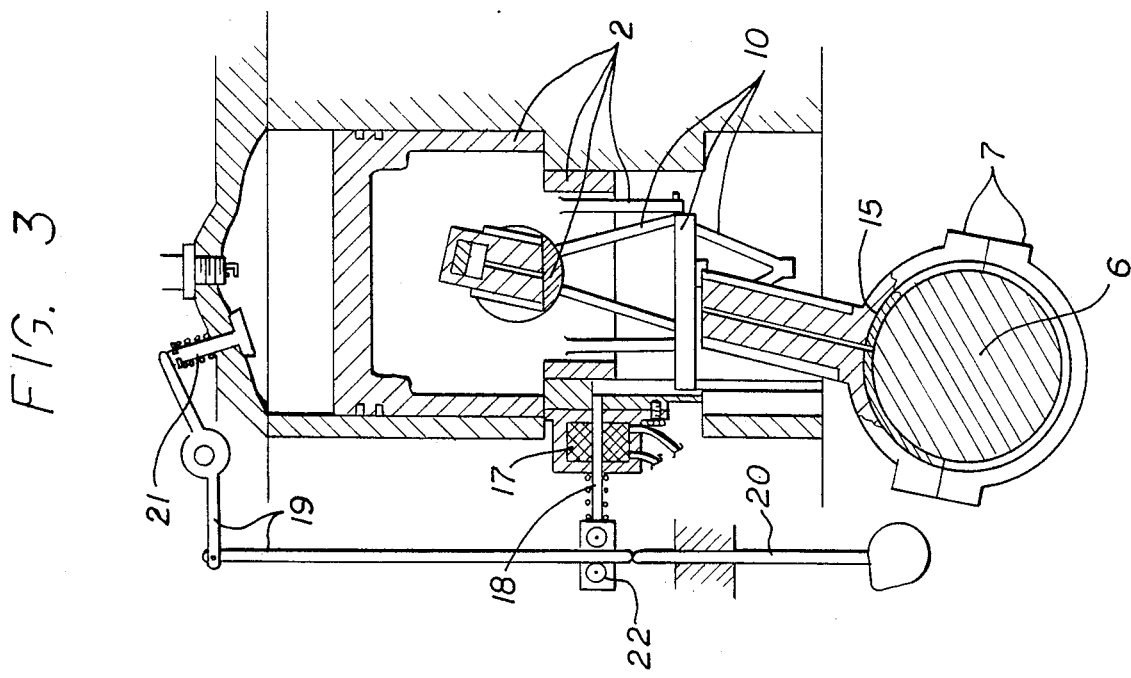
Figure 4:
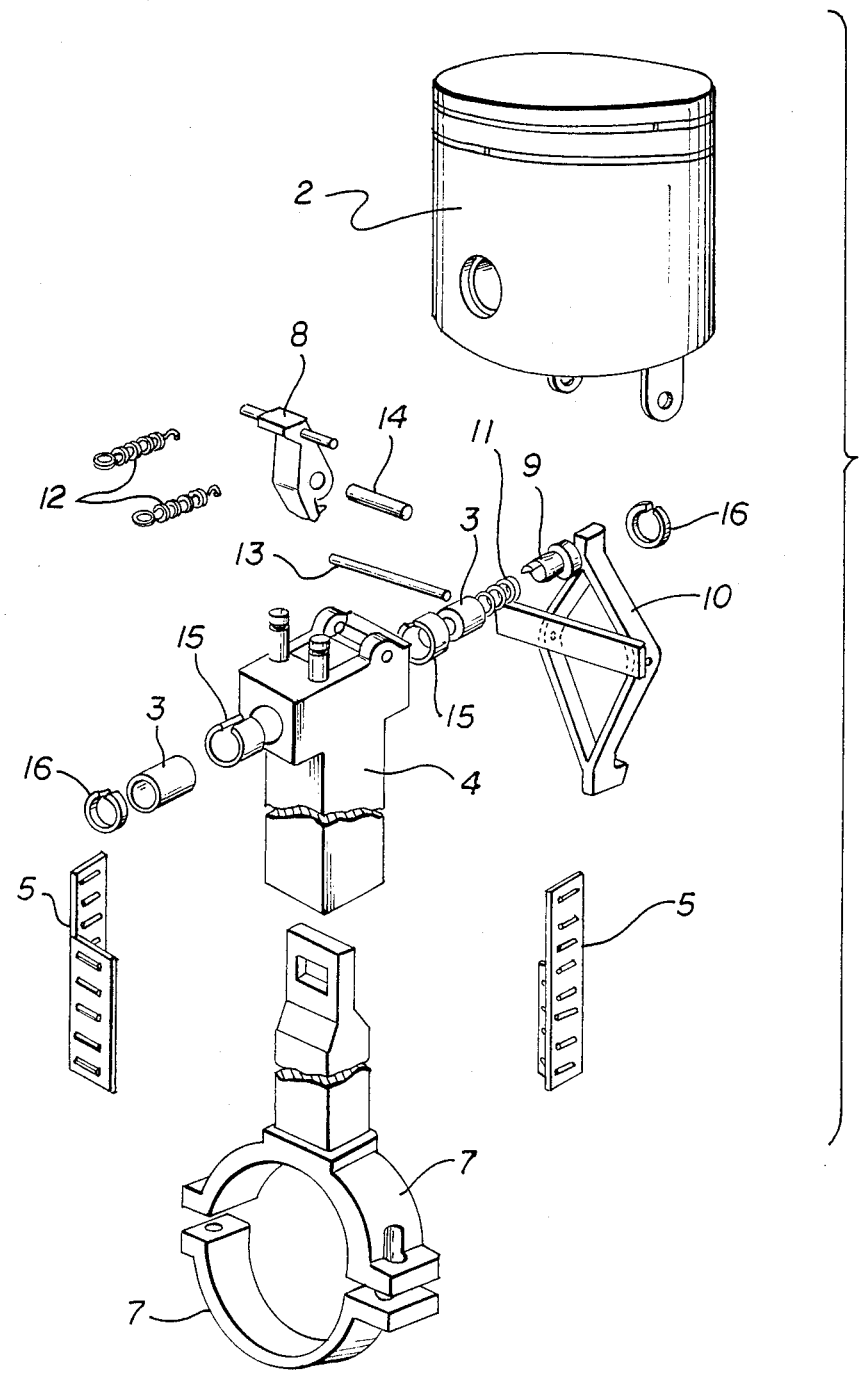
FIG. 4 shows an exploded view of the connecting arm, the bearing block, locking mechanism comprising the locking lever, locking pin and the locking plate, the piston with its extended arms and various other components.

FIGS. 2 and 3 show the piston in the active mode. The solenoid coil is de-energized and the plunger is pulled out of the cylinder by a spring. In this position, the shifter mounted on the plunger brings the hanging segments of all the rocker arms in line with their respective push rods thus enabling normal movements of the valves. The locking plate freely supported in the extended arms of the piston can also freely move with the piston throughout its full stroke. In this condition, compression spring 11 pushes pin 9, and the top end of the locking plate is pushed against the inner face of the circlip. Tension springs 12, pull the top portion of the locking lever 8, into the squarish hole in the bearing block, till its top taper face wedges against it, while the bottom face of the connecting arm is in contact with a face on a shoulder of the bearing block; to give an appearance and performance of the combination of the bearing block and the connecting arm, not unlike that of the connecting rod of a conventional engine.

To park the piston, as in FIG. 1, solenoid 17 is energized causing the plunger 18 to be pulled into the relieving groove of the cylinder. Towards the end of the upward movement of the locking plate; its projection in the groove, the top face of which is now in the same horizontal plane as the axis of the pivot pin 13, is obstructed by this plunger, causing it to tilt around this pivot axis. This simultaneously causes its lower tip to penetrate in a recess in the cylinder bore, and its upper tip to push at the locking pin and thereby the bottom of the locking lever. The former action causes the piston to be held within the cylinder bore; and the latter action causes the rotation of the locking lever resulting in its withdrawal from the bearing block, thereby disengaging the bearing block and the connecting arm. By the top dead center position of the piston, this action is completed and further movement of the crankpin carries with it only the bearing block without the connecting arm, leaving the piston at its topmost position, and causing the connecting arm to oscillate like a pendulum pivoting around the stationery gudgeon pins with its axis in line with the center of the crankpin. Anti-friction needle bearings 5 reduce the friction in the relative reciprocating motion between the connecting arm and the bearing block. The retracted plunger simultaneously shifts the hanging segments of the rocker arms out of line with the push rods, thus eliminating the movement of the valves for the duration of the parked piston. The substitution of the friction between the piston assembly and the cylinder by the lesser friction between the connecting arm and the bearing block, the reduced frictional forces in the main journals and crankpin bearings of the crankshaft due to decreased inertial forces generated by a lower reciprocating mass, and the elimination of mechanical losses in gas exchange and valve gear, result in the modified engine with one or more passive cylinders being more efficient in operation than conventional engines.

The de-energizing of the solenoid coil occuring before or at the top dead center position of the crankpin in any cycle reverses the above actions causing the connecting arm to be again engaged with the bearing block and the piston to be free within the cylinder. The hanging segments of the rocker arm also get aligned with the push rods, finally resulting in the restoration of all active functions of the cylinder as in a conventional engine.

In the embodiment of the four stroke engine described above, the piston is rendered passive at the top the latch, the following four logic variables are obtained:

$$C1^* = L1.L0 + (L1+L0).Q4 + \overline{L0}.Q3.\overline{Q4}$$

$$C2^* = L2 + L3$$

$$C3^* = L3$$

$$C4^* = L2.L3.$$

These four signals become the controlling signals for the 4 cylinders of the engine. A logical signal 1 on any signifies that the cylinder should be in the active mode, and a logical signal 0 signifies that the cylinder should be in the passive mode.

The duty cycle and the indicated power of the engine with four cylinders operating as described is shown graphically in the following table:

TABLE 1

| BINARY OUTPUT CODES | | | | INDICATED POWER | DUTY CYCLE | | | | |
|---|---|---|---|---|---|---|---|---|---|
| | | | | | 1ST CYL. ACTIVE IN SUB-PERIOD | | | | 2ND CYL. 3RD CYL. 4TH CYL. (THESE ARE ACTVE IN |
| L3 | L2 | L1 | L0 | (% OF Ni max) | I | II | III | IV | ALL SUB-PERIODS) |
| 0 | 0 | 0 | 0 | 6.25 | | XX | | | |
| 0 | 0 | 0 | 1 | 12.5 | | | XX | XX | |
| 0 | 0 | 1 | 0 | 18.75 | | XX | XX | XX | |
| 0 | 0 | 1 | 1 | 25.00 | XX | XX | XX | XX | |
| 0 | 1 | 0 | 0 | 31.25 | | XX | | | XXXXXXXX |
| 0 | 1 | 0 | 1 | 37.5 | | | XX | XX | XXXXXXXX |
| 0 | 1 | 1 | 0 | 43.75 | | XX | XX | XX | XXXXXXXX |
| 0 | 1 | 1 | 1 | 50.0 | XX | XX | XX | XX | XXXXXXXX |
| 1 | 0 | 0 | 0 | 56.25 | | XX | | | XXXXXXXXXXXXXXXX |
| 1 | 0 | 0 | 1 | 62.5 | | | XX | XX | XXXXXXXXXXXXXXXX |
| 1 | 0 | 1 | 0 | 68.75 | | XX | XX | XX | XXXXXXXXXXXXXXXX |
| 1 | 0 | 1 | 1 | 75.00 | XX | XX | XX | XX | XXXXXXXXXXXXXXXX |
| 1 | 1 | 0 | 0 | 81.25 | | XX | | | XXXXXXXXXXXXXXXXXXXXXXXX |
| 1 | 1 | 0 | 1 | 87.5 | | | XX | XX | XXXXXXXXXXXXXXXXXXXXXXXX |
| 1 | 1 | 1 | 0 | 93.75 | | XX | XX | XX | XXXXXXXXXXXXXXXXXXXXXXXX |
| 1 | 1 | 1 | 1 | 100.00 | XX | XX | XX | XX | XXXXXXXXXXXXXXXXXXXXXXXX | dead center position always only between the exhaust stroke and the admission stroke due to a provision which is explained below.

FIG. 5 describes the electronic circuit which controls the engine. Potentiometer 24 is mechanically driven by the accelerator pedal to generate a voltage signal proportional to its displacement. A feedback voltage proportional to the speed of the engine is subtractred from this input voltage and the result is amplified. Depressing the brake lever causes another input to the amplifier resulting in its maximum positive output voltage.

The analog signal from the amplifier is converted into a 4 bit binary code in the A/D convertor with the bits designated as L0,L1,L2 and L3 in increasing order of significance. A negative or nil input gives the output 0000, and positive magnitudes above and of a certain value generate the highest binary output 1111. Intermediate analog values get converted to intermediate binary values of the output as programmed. This 4 bit output is held in a latch and the data at the output of the latch is refreshed only after every 16 cycles of the engine on the falling edge of output Q4 described below. This period of 16 cycles is further subdivided into 4 sub-periods of 4 cycles each.

A pulse is obtained from the engine at every cycle and is fed to a 12 stage binary divider/counter. The four possible combinations of the binary coded outputs at Q3 and Q4 each define a 4 cycle sub-period. Using these outputs together with the 4 bits of binary outputs from the latch, the following four logic variables are obtained:

The logical values of the virtual cylinders are assigned to actual cylinders on a rotating basis. The outputs Q10 and Q11 from the binary divider/counter corresponding to every 512th and 1024th cycles of the engine, by their different combinations, select different outputs from each of the four multiplexers from the common inputs - C1*,C2*,C3* & C4*, and they become the controlling logic variables for individual cylinders, as below:

TABLE II

| SELECT INPUTS | | MULTIPLEXED OUTPUTS | | | |
|---|---|---|---|---|---|
| Q10 | Q11 | C1 | C2 | C3 | C4 |
| 0 | 0 | C1* | C2* | C3* | C4* |
| 0 | 1 | C2* | C3* | C4* | C1* |
| 1 | 0 | C3* | C4* | C1* | C2* |
| 1 | 1 | C4* | C1* | C2* | C3* |

The assigned solenoids are energized by the outputs from the multiplexers through individual D flip-flops. A shaft encoder on the camshaft of the engine generates timing pulses on independent lines, at 10 degrees before the top dead center position of every piston, at the end of the exhaust stroke. These pulses clock the corresponding D flip-flops to ensure that the state-changes of the flip-flops are in synchronism with the individual working cycles of the corresponding cylinders.

Independent solenoid- operated plungers (not shown in the drawings), deliver fuel into the cylinders during their admission and compression strokes. This fuel injection which is followed by the ignition spark, occurs in a cylinder only when, (1) its piston is active, and (2) the brake pedal is not pressed. The amount of fuel injected is controlled by the stroke of the plungers which is adjusted according to the required richness or leanness of the mixture.

SCOPE OF THE INVENTION

As there are many types of machines to which the benefits of the invention can be applied, so will there be many different ways and means of putting the invention in practice, for different machines. The names given to the individual components in this description are only suggestive of their function in the machine, and do not restrict the construction, shape or size of the components.

I claim:

1. A machine with at least one reciprocating piston comprising: at least one crankshaft with at least one crankpin, at least one cylinder which is provided with components including a piston, a connecting arm journaled to the piston, a bearing block assembled around the crankpin of the crankshaft and which connects to the connecting arm and a locking device; characterized in that there are provided means for lockably engaging the bearing block and the connecting arm, by the use of the locking device, in one operating mode, means for enabling freedom of relative movement between the bearing block and connecting arm in a second operating mode, and means for selectively changing between the two operating modes, in synchronism with both the piston and the crankpin being either at, or approximate to their top or bottom center positions.

2. A machine as claimed in claim 1, where the means for enabling freedom of relative movement between the bearing block and the connecting arm comprise needle bearings located between the bearing block and connecting arm to allow a straightline reciprocating movement.

3. A machine as claimed in claim 1, provided with means to locate, hold or restrict the position of the piston in the cylinder at or approximately at either the top or bottom dead center positions in the second operating mode.

4. A machine as claimed in claim 1, where the means for selectively changing between operating modes comprises means to one of assess and measure the load on the machine, and means to cause an increased number of cycles in the first operating mode when the load increases and means to cause an increased number of cycles in the second operating mode when the load decreases, at the same machine speed.

5. A machine as claimed in claim 1, where the piston is connected to the connecting arm by means of at least one gudgeon pin and where a part of the bearing block extends either within, alongside, or around the connecting arm in the first operating mode, and where at least a part of the locking device is located and acts from either within, around, or in the close proximity of any of the gudgeon pins.

6. A machine as claimed in claim 1, provided with means to lockably engage the bearing block to the connecting arm at alternate positions, resulting in alternate compression ratios for the cylinder.

7. A machine as claimed in claim 1, which is provided with means to admit fuel into the cylinders, means to open and close cylinder valves, and means to cause an electric ignition spark; and which functions as an internal combustion engine.

8. A machine as claimed in claim 7, which is a four-stroke internal combustion engine, provided with means for switching from the first operating mode to the second operating mode, only at the beginning or at the end of the suction stroke of the cycle.

9. A machine as claimed in claim 7, provided with means to override means to admit fuel into the cylinders, means to override means to open or close cylinder valves, and means to override means to cause electric ignition spark in any cylinder for the duration of the cycles for which the cylinder is in the second operating mode.

10. A machine as claimed in claim 1 which is an internal combustion engine which is provided with means to inject fuel into the cylinders, means to open and close cylinder valves, and means to cause an electric ignition spark.

11. A machine as claimed in claim 1 which is provided with means to admit fuel into the cylinders and means to open and close cylinder valves, and which functions as an internal combustion engine.

12. A machine as claimed in claim 11, which is a four-stroke internal combustion engine, provided with means for switching from the first operating mode to the second operating mode, only at the beginning or at the end of the suction stroke of the cycle.

13. A machine as claimed in claim 11, provided with means to override means to admit fuel into the cylinders and means to override means to open or close cylinder valves for the duration of the cycles in which the cylinder is in the second operating mode.

14. A machine as claimed in claim 11, provided with means to override means to admit fuel into the cylinders, means to override means to open or close cylinder valves, and means to override means to cause electric ignition spark in the cylinders for the duration of the cycles in which the cylinder is in the second operating mode.

15. A machine as claimed in claim 11, provided with means to override means to admit fuel into the cylinders, and means to override means to cause electric ignition spark in the cylinders for the duration of the cycles in which the cylinder is in the second operating mode.

16. A machine as claimed in claim 1 which is provided with means to admit fuel into the cylinders and means to cause an electric ignition spark and which functions as an internal combustion engine.

17. A machine as claimed in claim 16, which is a four-stroke internal combustion engine, provided with means for switching from the first operating mode to the second operating mode, only at the beginning or at the end of the suction stroke of the cycle.

18. A machine as claimed in claim 16, provided with means to override means to admit fuel into the cylinders and means to override means to open or close cylinder valves for the duration of the cycles in which the cylinder is in the second operating mode.

19. A machine as claimed in claim 16, provided with means to override means to admit fuel into the cylinders, means to override means to open or close cylinder valves, and means to override means to cause electric ignition spark in the cylinders for the duration of the cycles in which the cylinder is in the second operating mode.

20. A machine as claimed in claim 16, provided with means to override means to admit fuel into the cylinders, and means to override means to cause electric ignition spark in the cylinders for the duration of the cycles in which the cylinder is in the second operating mode.

* * * * *